United States Patent
Scholten (10) Patent No.: US 6,330,081 B1
(45) Date of Patent: Dec. 11, 2001

(54) CROSSTALK CANCELLATION IN A MULTI-COLOR CCD SIGNAL PROCESSOR

(75) Inventor: Frank Lynn Scholten, Livingston, NJ (US)

(73) Assignee: Agfa Corporation, Wilmington, MA (US)

( * ) Notice: Subject to any disclaimer, the term of this patent is extended or adjusted under 35 U.S.C. 154(b) by 0 days.

(21) Appl. No.: 09/197,355

(22) Filed: Nov. 20, 1998

(51) Int. Cl.$^7$ ............................................. H04N 1/38
(52) U.S. Cl. ........................... 358/463; 358/483; 358/515
(58) Field of Search .................... 358/494, 474, 358/482, 471, 483, 13, 514, 515, 530; 348/294, 241

(56) References Cited

U.S. PATENT DOCUMENTS

| | | | |
|---|---|---|---|
| 4,628,211 | 12/1986 | Ruppert | 250/578 |
| 4,974,072 | * 11/1990 | Hasegawa | 358/80 |
| 5,317,407 | * 5/1994 | Michon | 348/306 |
| 5,673,336 | * 9/1997 | Edgar | 382/167 |
| 5,801,772 | * 9/1998 | Asaida | 348/222 |
| 5,818,525 | * 10/1998 | Elabd | 348/268 |

FOREIGN PATENT DOCUMENTS

| | | | |
|---|---|---|---|
| 59-79688 | * 5/1984 | (JP) | H04N/5/30 |

* cited by examiner

*Primary Examiner*—Jerome Grant, II
(74) *Attorney, Agent, or Firm*—Robert A. Sabourin; Leo R. Reynolds (57) ABSTRACT

A method and apparatus are provided for canceling crosstalk noise arising on signal lines output from an image sensor. More specifically, the crosstalk noise is canceled by a current mirror that is coupled to the signal line. The current mirror adjusts the voltage level on the signal line by drawing a current therefrom that is proportional to the amount and polarity of the crosstalk noise. The amount of crosstalk noise is determined by an amount of coupling within an A/D converter coupled to the signal lines. The current mirrors can further adjust the voltage on the signal line by drawing a current therefrom that is proportional to crosstalk arising due to a voltage level on another signal line. Such a current mirror allows pixel data to be conveyed to the A/D converter, via the signal lines, without imparting aberrations due to crosstalk noise.

14 Claims, 10 Drawing Sheets

CROSSTALK CANCELLATION IN A MULTI-COLOR CCD SIGNAL PROCESSOR

BACKGROUND OF THE INVENTION

Flat bed scanners are devices used for digitizing documents such that they may be viewed or edited by a computer system, for example. In a typical flat bed scanner system, the face of an original document (hereinafter referred to as the "original") is placed upon a flat, transparent reference surface. The original document is fixed on the surface such that a line of the original, herein after referred to as a "scan line," is illuminated from above. The light reflected from the scan line is directed through an optical system to form an image of the scan line on a sensor, such as a charge-coupled device (CCD) array or CMOS sensor device. The sensor converts the optical signal into an electronic representation. The electronic representation is typically a sequence of voltages that correspond to the levels of the associated pixels located along the scan line. The original is scanned by moving the illumination system, optical system and CCD sensor relative to the original, along a direction hereinafter referred to as the "scanning axis". However, systems also exist in which the original document is moved relative to a fixed optical system, i.e. sheet-feed scanners.

Recently, trilinear CCD's have become increasingly common for color scanning. The typical trilinear CCD is comprised of three rows of photosensor elements. Each row of photosensor elements, referred to as a photosensor array, is covered by a red, green or blue integral filter stripe for spectral separation. When the CCD is viewed from the end, the three color pixel sensor arrays (red, green and blue (RGB)) are separated by a physical channel or gap. That interchannel spacing is hereinafter referred to as the optical line spacing (OLS).

The three photosensor arrays are individually activated to convert the incoming light to a representative charge. After a predetermined exposure, the photodiodes that make up a photosensor array transfer their charge to the associated shift registers. That charge is then shifted to the output stage. The shift registers are associated with odd and even photodiodes and, as such, the charge contained therein is shifted to the output stage in an interlaced manner. That interlaced manner allows the charge from even and odd samples to be output in sequential order. The respective charges from each color are converted into representative analog voltages and multiplexed into a single A/D converter. Because the A/D converter can only digitize a single analog voltage, the multiplexer is incorporated into the data receiving port of that A/D converter. The control logic for that multiplexer allows the red, green, and blue voltages to sequentially pass to the actual analog to digital converter circuitry. For example, voltages representing red, green and blue sample data are placed on the three analog signal lines coupled to the multiplexer. Sequentially, each of those voltages is passed to the A/D converter circuitry and digitized. When each of the three voltages is digitized, a new set of voltages representing the next red, green and blue sample data is placed on the analog signal lines.

Because all of the analog signals pass through a single A/D converter, coupling within that A/D converter allows analog voltages from other colors to couple into the active color's analog voltage. Any noise which results from cross-coupling of any multi-color signals during image acquisition (prior to digitization) is referred to as crosstalk noise. Because each of the three analog voltages presented to the multiplexer represent pixels at different locations in the original, aberrations caused by the above mentioned sources are spread throughout the resulting digitized image. Such an aberration can sometimes be detected by the human eye. Therefore, a method and apparatus are needed for canceling crosstalk noise such that aberrations do not arise in a resulting digital image.

SUMMARY OF THE INVENTION

In accordance with the present invention, a method and apparatus are provided for canceling crosstalk noise arising on signal lines from an image sensor. More specifically, in the preferred embodiment the crosstalk noise is canceled by a compensation circuit, preferably a current mirror, that is coupled between signal lines. The current mirror adjusts the voltage level on the signal line by drawing a current therefrom that is proportional to the amount, and opposite the polarity, of the crosstalk noise. The current mirror can further adjust the voltage on the signal line by drawing a current therefrom that is proportional to crosstalk arising due to a voltage level on another signal line. Such a current mirror allows pixel data to be conveyed to an A/D converter, via the signal lines, without imparting aberrations due to unwanted noise.

In general, according to one aspect, the invention features an apparatus for canceling crosstalk noise on signal lines from an image sensor device. A compensation circuit is coupled to a first signal line to adjust its electrical characteristics in response to a second signal line such that the crosstalk noise arising on the first signal line due to the second signal line is at least partially canceled.

In specific embodiments, the compensation circuit adjusts an electrical characteristic of the first signal line in response to an electrical characteristic of the second signal line. For instance in a preferred embodiment, the electrical characteristic of the first signal line is current drawn from the line while the electrical characteristic of the second line is voltage across the line.

In general according to another aspect, the invention also features a scanner comprising an image acquisition device, an analog to digital converter, and separate analog signal paths that convey the image signals corresponding to different colors from the image acquisition device to the analog to digital converter. At least one compensation circuit connects between the analog signal paths to at least partially cancel crosstalk noise between the analog signal paths.

Finally, the invention also relates to a method for canceling crosstalk noise on signal lines from an image sensor device. The method comprises connecting a compensation circuit to a first signal line and adjusting, by the compensation circuit, an electrical characteristic of the first signal line in response to an electrical characteristic of a second signal line such that crosstalk noise arising on the first signal line due to the second signal line is canceled.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF THE INVENTION

Figure 1:
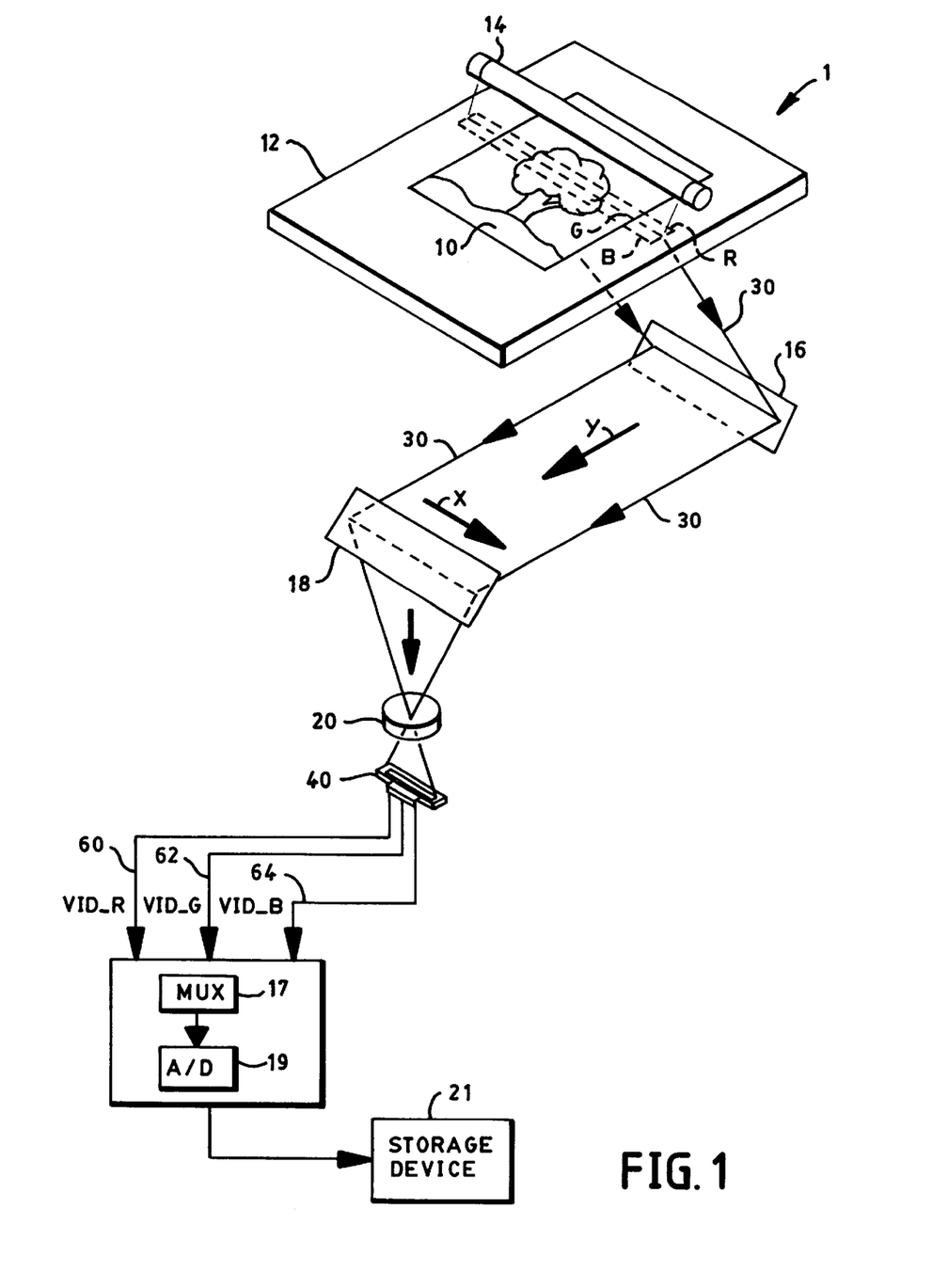
FIG. 1 is a schematic drawing depicting a scanning system including a trilinear CCD device.

Referring to the drawings, FIG. 1 illustrates portions of one embodiment of an imaging system based upon a trilinear color photosensor array. The components and architecture of the imaging system can vary as known in the art. For instance, any multi-channel image acquisition device could be used. The photosensor is usually a CCD or similar CMOS sensor device. The imaging system includes a reflective or transmissive flatbed scanner 1 having a glass plate reference surface 12 and a document illumination system comprising a light source 14. An associated optical system comprises relay mirrors 16 and 18, and a magnification lens 20 which focuses an image of three color scan lines onto a CCD 40. A linear drive system moves a carriage containing the illumination system, optical system and CCD along the y-axis direction to detect successive scan lines. An original 10 to be scanned is placed on the top of glass surface 12 and, in the system of FIG. 1, is transmissively illuminated by the light source 14. Although maximum benefit of the present invention is realized for transmissive scanning, reflective scanning is also beneficial to a lesser degree. The resulting image in FIG. 1 is reflected via the optical pathways of mirrors 16 and 18 onto the CCD 40.

During color scanning, three scan lines of the original are illuminated by the beam of white light from the light source 14. Reflected light is focused by the lens 20 onto the CCD array 40. The color components of the image are sequentially captured by the CCD 40 with three separate rows of photosensors. Each row of photosensors has a red, green, or blue filter and collects representations of the captured color components in an associated sensor array. When the array has collected a sufficient number of electrons, the CCD transfers the signals to odd and even shift registers (not shown) which are built into the CCD 40. The electrons are shifted to an output stage which interlaces the odd and even data back into single file and converts them into analog signals on the analog signal lines VID_R, VID_G and VID_B, which correspond to the color components stored in each shift register. The analog signals are input to a multiplexer 17 that sequentially conveys them to an A/D converter circuit 19. The signals are thereafter stored in a memory 21.

Figure 2:
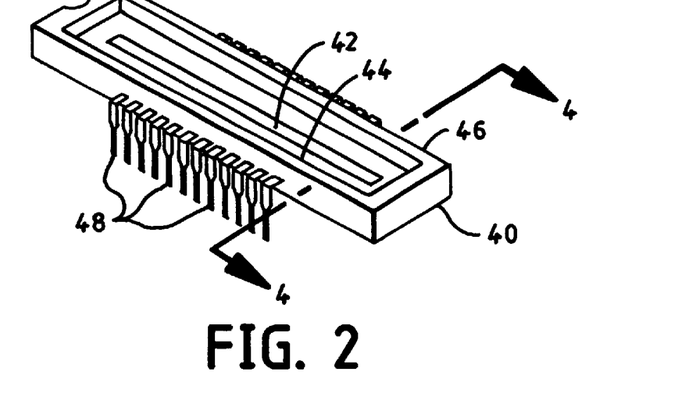
FIG. 2 is a perspective view of the trilinear CCD device of FIG. 1.
Figure 3:
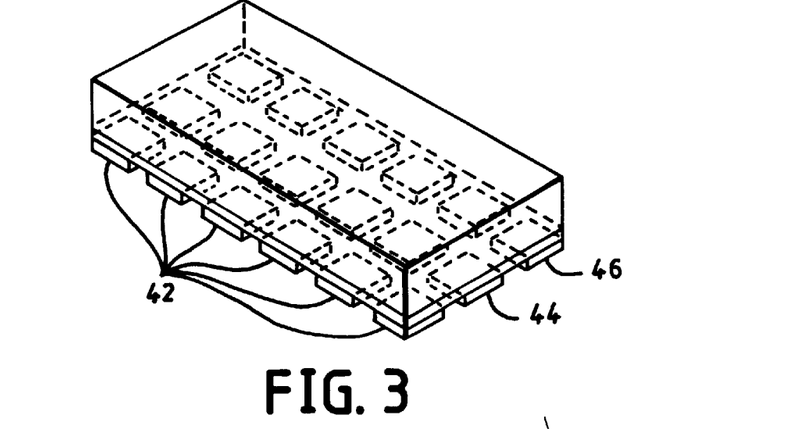
FIG. 3 depicts the photosensor elements of the CCD device of FIG. 1.

FIGS. 2 and 3 illustrate how red 42, green 44 and blue 46 sensors of a trilinear CCD 40 comprise three rows of color filter stripes for spectral separation. FIG. 3 illustrates the pixel data sensed by the middle row of sensors, i.e. the green sensor array 44. Generally, the CCD 40 is an analog solid state device that converts an amount of optical input 30 into a proportional amount of output charge. The CCD sensors measure the light intensity of the reflected rays and convert the rays into electrons stored in a well. Each row of color sensors produces a plurality of electrical voltages representing the color values of the pixels of a line being scanned.

More specifically, before the photosensors begin to collect electrons from the incident light, they are initialized to a predetermined "black" level. The initial value of the photosensors, therefore, represents an absence of collected electrons. Thereafter, the photosensors are exposed to the incident light for a predetermined amount of time such that a number of electrons are collected. The number of electrons are proportional to the intensity or "white" level for the associated color component of the incident light. The voltage that is output from the output stage of the CCD is the difference between the voltage associated with the predetermined black level with respect to the voltage associated with the collected electrons, i.e., the detected white level. Accordingly, the output stage of the CCD generates a signal that increases negatively with an increased amount of white detected intensity.

The analog signals which are output from the CCD 40 are typically converted into digital data by a suitable A/D converter, such as an AD9807 manufactured by Analog Devices Corporation. The digital data is further processed (not shown) as well known in the art to correct for imperfections due to the non-uniformities of the CCD sensor elements and analog electronics.

Figure 4:
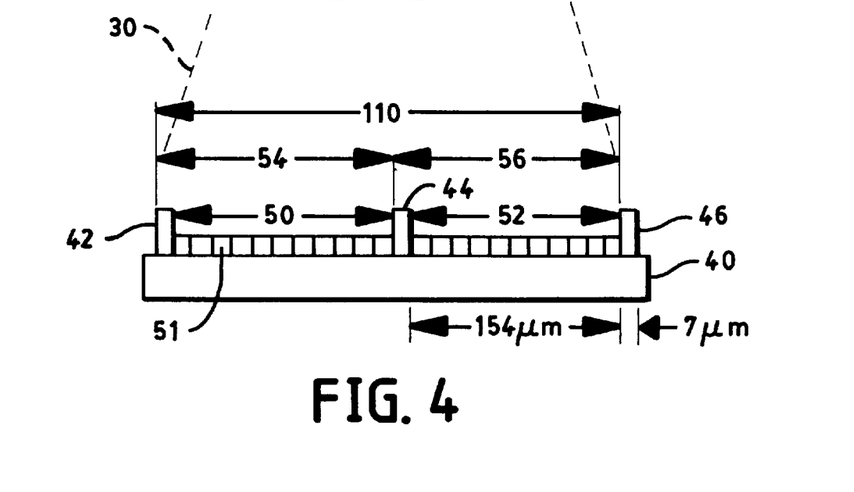
FIG. 4 is a cross-sectional view of the trilinear CCD device of FIG. 2.

FIG. 4 diagrammatically illustrates a cross-section (see line 4–4 in FIG. 2) of a CCD 40 in the scanning direction Y. Typically, the red sensor array 42, also known as the master sensor, is the lead sensor in the scanning direction Y, which is typically followed by the green sensor array 44 and the blue sensor array 46, respectively. The red 42 and green 44 sensor arrays, and the green 44 and blue 46 sensor arrays, are separated by channels or gaps 50 and 52, respectively. Typically, channels 50 and 52 are manufactured in equal widths, each channel width being equal to an integer multiple of the distance measured center-to-center or edge-to-edge between adjacent photosensor elements or pixels in any array 42, 44, 46, longitudinally along the CCD. For purposes of illustration, the lengths of channels 50 and 52 are understood as being equivalent to twenty-one optical pixel lengths. However, scanning systems employing the present invention may have channel separations that are neither uniform nor have an integral number of pixels in length.

In general, the optical line spacing is the interchannel spacing between photosensor arrays as measured center-tocenter. The red-green optical line spacing 54 (shown edge-to-edge in FIG. 4) is the interchannel spacing between the red and green photosensor arrays, hereinafter also referred to as OLS(R:G). The green-blue optical line spacing 56 is the interchannel spacing between the green and blue photosensor arrays, hereinafter also referred to as OLS(G:B). The red-blue optical line spacing 110 is the interchannel spacing between the red and blue photosensor arrays, hereinafter also referred to as OLS(R:B). Since the width in the scanning direction Y of each photosensor array 42, 44 and 46 is one pixel, the OLS(R:G) 54 and OLS(G:B) 56 are each equivalent to twenty-two (22) optical pixels in length (154 microns), where one optical pixel length equals 7 microns. The OLS(R:B) 110 is equivalent to forty-four (44) optical pixels in length (308 microns).

Figure 5:
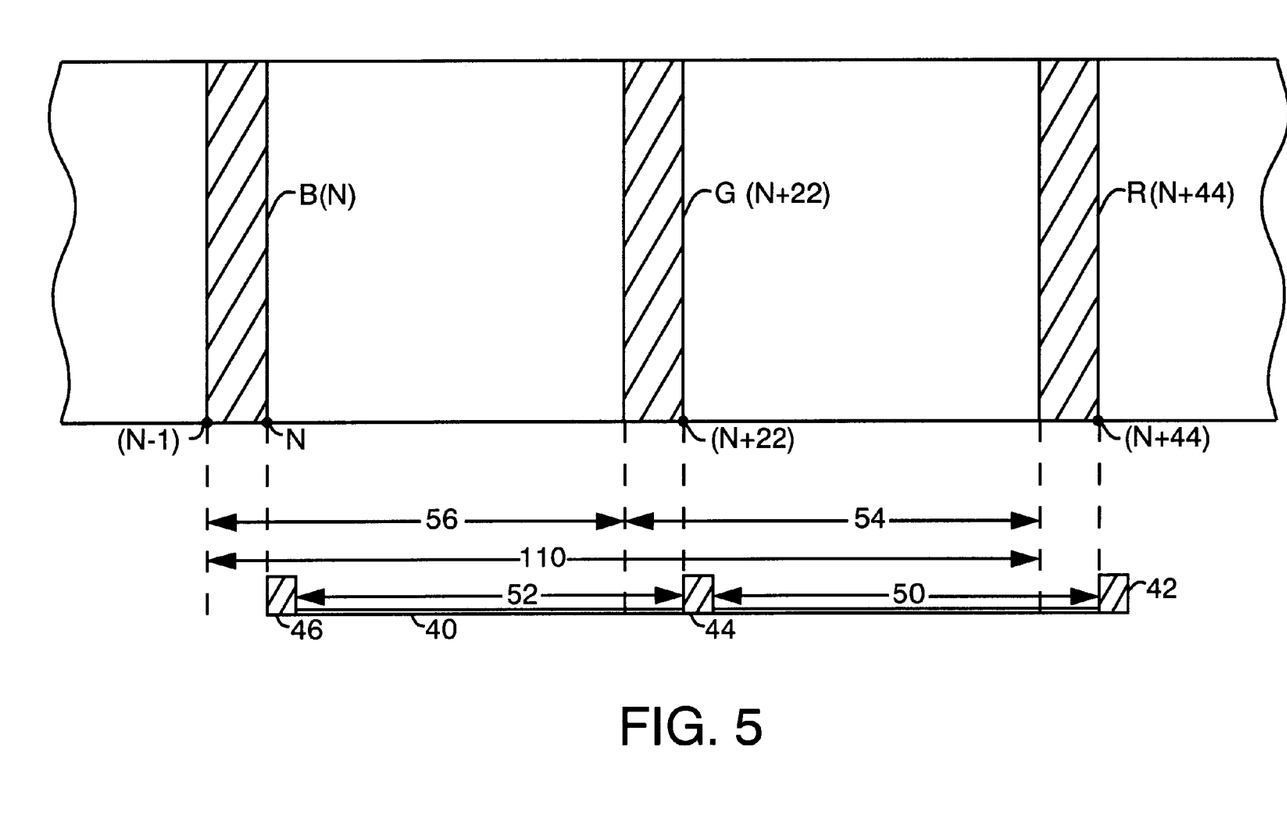
FIG. 5 illustrates how an image is scanned using the scanning system of FIG. 1.

FIG. 5 diagrammatically illustrates how a scanning system having a CCD 40 with the above characteristics performs an optical scan. The CCD 40 is shown in edgeview moving relative to the original 10, which is shown in topview. Lines R(N+44), G(N+22) and B(N) are the actively scanned lines at some incremental point in time, $t_{N+44}$ where N is an integer.

Usually, the red 42, green 44 and blue 46 color photosensors scan their respective portions of the document 10 simultaneously. Thus, each cycle of data collection results in three different line scans, one for each color taken from three different locations in the document. FIG. 5 further shows the scan lines after N+44 lines of red pixel data have been scanned. The currently scanned lines R(N+44), G(N+22) and B(N) are staggered by distances equal to the OLS(R:G) 54, (which in this example, is equivalent to OLS(G:B)) because of the uniform spacing of the CCD's RGB photosensor elements, 42, 44 and 46. FIG. 5 specifically shows how the active scan line for the red pixels R(N+44) is shifted by a distance equal to the OLS(G:B) 56 (22 optical pixel lengths) with respect to the scan line for the green pixel data G(N+22). The scan line for the green pixels G(N+22) is shifted by the same OLS(R:G) 54 with respect to the scan line for the blue pixel data B(N). The scan line for the red pixels R(N+44) is shifted by the OLS(R:B) 110 (44 optical pixel lengths) with respect to the scan line for the blue pixel data B(N).

The scanning system channels all of the analog scan signals, output from the CCD, through a single A/D converter. Accordingly, noise from the red, green or blue signals can couple onto one another, for instance, within the A/D converter. Such an effect is referred to as "crosstalk". This is especially noticeable in the resulting digital image when a sharp transition of pixel values is encountered in the scanned image. The sharp transition causes crosstalk noise that can couple into the other color channels.

Figure 6:
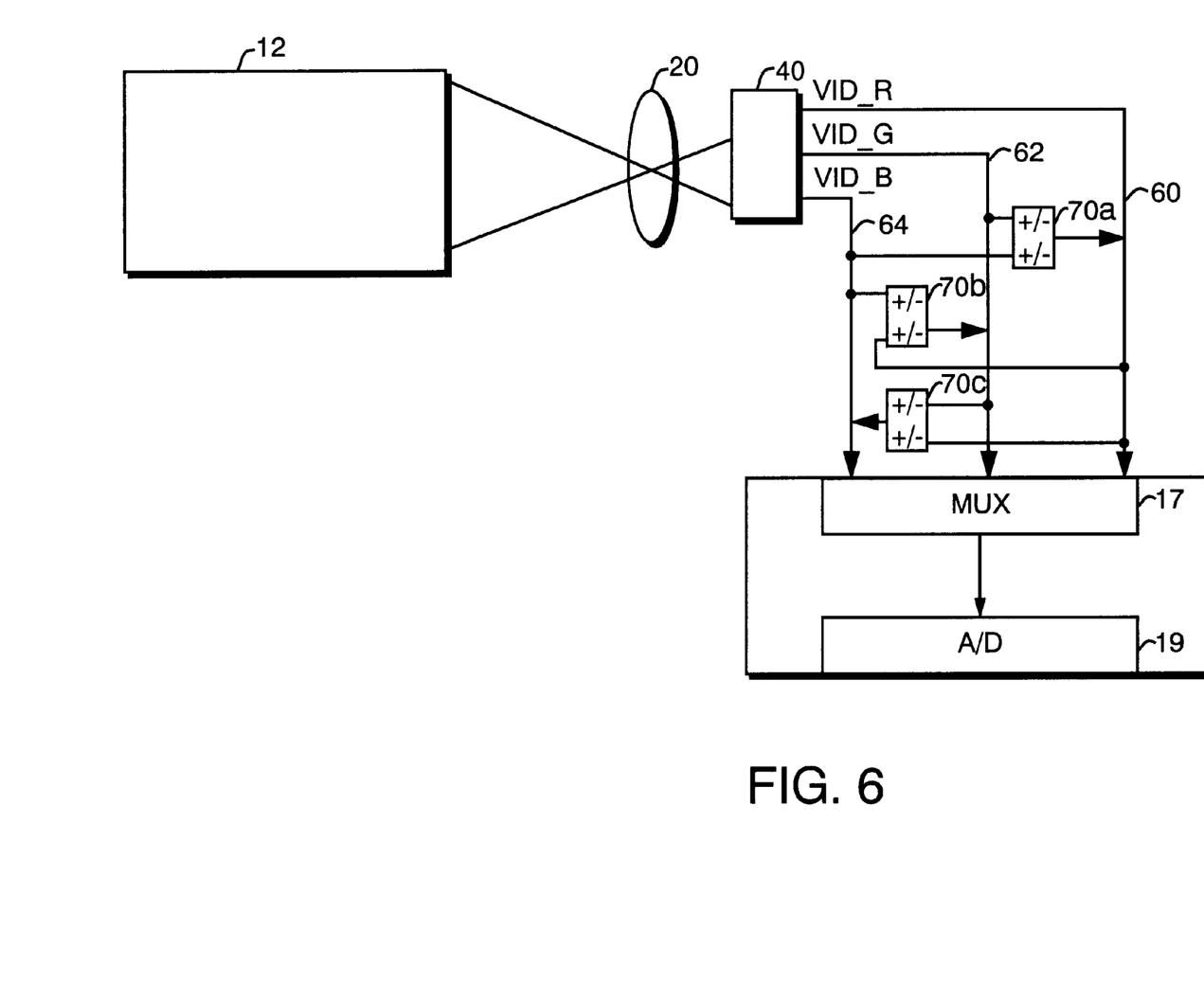
FIG. 6 depicts a scanning system having crosstalk compensation circuits in accordance with the present invention.

FIG. 6 shows an embodiment of the present invention for canceling the above-mentioned inter-channel crosstalk noise. The CCD 40 is coupled to separate analog signal lines which carry the red (VID_R) 60, green (VID_G) 62 and blue (VID_B) 64 output signals. The analog signal lines 60–64 are each coupled to a single A/D converter 19 via a multiplexer 17. Connected between each of the analog signal lines are current mirrors 70a–70c. Each of the current mirrors 70a–70c includes a first port coupled to the analog signal line that has crosstalk noise arising on it. Each current mirror 70a–70c has other ports coupled to the remaining analog signal lines. The current mirrors 70a–70c draw a controlled amount of current from each analog signal line, in proportion, and negatively polarized, to an associated amount of crosstalk noise. In this manner, the amount of crosstalk noise that arises on each analog signal line is canceled.

Crosstalk noise will be referred to herein as having either a positive or negative polarity. The polarity of the crosstalk noise is determined by measuring the average pixel values within an aberration that has been imparted to a test image. That test image includes a small area of bright pixels, such as white pixels, surrounded by a large area of dark pixels, such as black pixels. The crosstalk typically appears in the resulting digital image as a "ghost" of the bright pixels which is offset and imposed on the dark pixel area. That ghost image contains pixels that are either brighter than the surrounding dark pixels or darker than the surrounding dark pixels. When the ghost image contains pixels that are brighter than the surrounding dark pixels, they have higher values than the dark pixels. That type of crosstalk is said to be "positive crosstalk," which can be canceled by decreased current draw from the associated analog signal line when the analog signals are being conveyed to the A/D converter 19. When the ghost image contains pixels that are darker than the dark pixels, they have lower values than the surrounding dark pixels. That type of crosstalk is said to be "negative crosstalk," which can be canceled by increased current draw from the associated analog signal line when the analog signals are being conveyed to the A/D converter 19.

Figure 7:
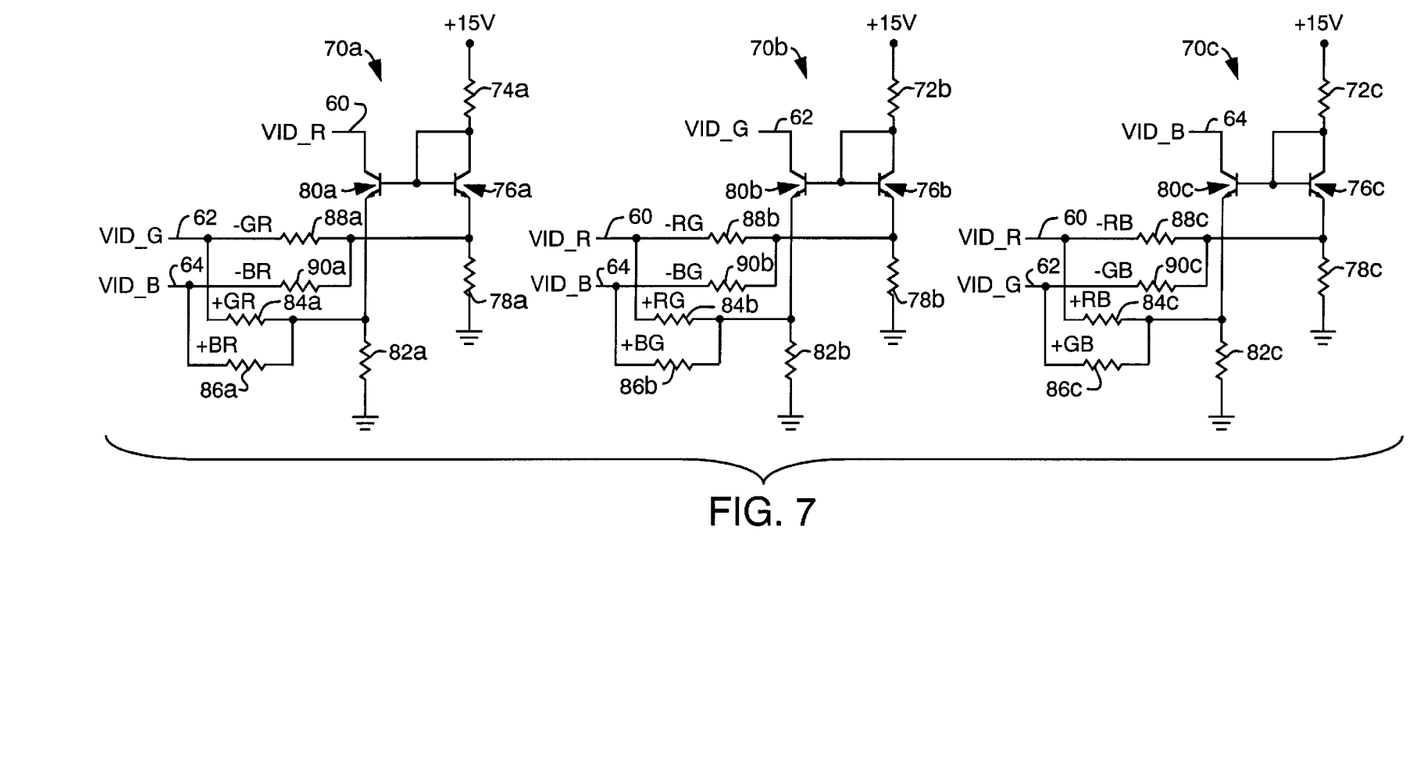
FIGS. 7A, 7B and 7C are circuit diagrams of the three crosstalk compensation circuits of FIG. 6, respectively, according to the invention.

More particularly, the method for determining whether positive or negative crosstalk is arising on any of the analog signal lines includes the steps of: scanning the test image; decomposing the scanned image into color components; for each color channel, measuring the amount of crosstalk due to each of the other color channels; determining, from the circuit impedance, the values of resistors or other circuit components necessary to offset the crosstalk. Exemplary circuits which could be used to implement the present invention are shown in FIGS. 7A, 7B and 7C. The above mentioned test image is scanned using the scanning system of FIG. 6., without installing the resistors 84–90 associated with the current mirrors 70a–70b. The resulting digital image is decomposed into its component colors and examined to determine the location of the ghost image pixels. Based upon the arrangement of the photo sensor arrays, the ghost image pixels arising due to crosstalk from each of the colors, can be identified based upon where they are located in each color decomposed image. That area of the image is then enhanced to more clearly show the ghost image.

Next, considering only the red components, the average level of the red pixels within the ghost image, due to the green analog signal line, is compared to the average level of the red components of the surrounding dark pixels. Further, the same measurement is made to determine how much higher or lower the average level of the red pixels inside the ghost image due to the blue analog signal line is compared to the average level of the red pixels surrounding the ghost image.

These measurements are repeated with respect to the ghost images arising when the test image is decomposed into its green components and further with respect to the ghost images arising when the test image is decomposed into its blue components. Sample results from such an operation are shown below:

|  | Red Ghost | Green Ghost | Blue Ghost |
|---|---|---|---|
| (1) Red surrounding level | — | −3.83 | +0.62 |
| (2) Green surrounding level | +1.71 | — | +2.16 |
| (3) Blue surrounding level | −2.85 | +3.09 | — |

The first line of the results indicates that the difference of the average red pixel values within the ghost image due to green analog signal line with respect to the red pixel values of the surrounding image is —3.83. The results also indicate that the difference of the red pixel values of the surrounding image with respect to the average red pixel values within the ghost image due to the blue analog signal line is +0.62. The absence of data in the first location of the table indicates that no ghost image is induced on the red analog signal line due to itself. The remainder of the results should be interpreted in the same manner.

After the difference operation is complete, a determination is made as to what polarity of crosstalk is occurring. Because the intensity of the background pixels is subtracted from the average value of the pixels within the ghost image, a positive result indicates that the ghost image is lighter than the background. Further, a negative result indicates that the ghost image is darker than the surrounding pixels. Referring to the first measurement made above, the average value of the red pixels, inside the ghost image due to the green analog signal, is lower than the average level of the red component of the surrounding dark pixels. Therefore, negative crosstalk is coupling onto the red analog signal line with respect to the green analog signal line. Accordingly, positive crosstalk of an equivalent amount will be coupled into the red analog signal line from the green analog signal line to compensate. Alternatively, if the average value of the red pixels inside the ghost image due to the green analog signal line is higher than the average level of the red component of the surrounding dark pixels, positive crosstalk is coupling onto the red analog signal line with respect to the green analog signal line. Accordingly, negative crosstalk of an equivalent amount will be coupled into the red analog signal line from the green analog signal line to compensate.

Likewise, the above mentioned results indicate that the average level of the red pixels inside the ghost image due to the blue analog line is higher than the average level of the red component of the surrounding dark pixels. Therefore, positive crosstalk is coupling onto the red analog signal line with respect to the blue analog signal line. Accordingly, negative crosstalk of an equivalent amount will be coupled into the red analog signal line from the blue analog signal line to compensate. Alternatively, if the average level of the red pixels inside the ghost image due to the red analog signal line were lower than the average level of the red component of the surrounding dark pixels, negative crosstalk is coupling onto the red analog signal line with respect to the blue analog signal line. Accordingly, positive crosstalk of an equivalent amount will be coupled into the red analog signal line from the blue analog signal line to compensate.

The difference procedure is further performed for the ghost images generated in the blue component of the test image with respect to the red and green analog signal lines and further for the ghost images generated in the green component of the test image with respect to the red and blue analog signal lines. The data collected will determine the configuration of each current mirror 70a—70c.

The sample data shown above indicates that negative crosstalk is coupling onto the red analog signal line with respect to the green analog signal line, and positive crosstalk is coupling onto the red analog signal line with respect to the blue analog signal line. Accordingly, positive crosstalk based upon the green analog signal line and negative crosstalk based upon the blue analog signal line will be used to compensate the red analog signal line. Further, negative crosstalk from the red analog signal line and negative crosstalk from the blue analog signal line will be used to compensate the green analog signal line. Further, positive crosstalk based upon the red analog signal line and negative crosstalk from the green analog signal line will be used to compensate the blue analog signal line. The resulting apparatus for imposing these compensation effects will now be described.

Referring to FIGS. 7A, 7B and 7C, a schematic representation of the three current mirrors 70a–70c, respectively, is shown. Referring specifically to current mirror 70a, a fifteen-Volt power supply is coupled to a first terminal of a resistor 74a. Resistor 74a has a typical value of 3.32 k Ohms. The remaining terminal of resistor 74a is coupled to the collector and base of a transistor 76a. The emitter of transistor 76a is coupled to a second resistor 78a. Resistor 78a has a typical value of 49.9 Ohms. The base terminal of transistor 76a is further connected to the base terminal of a second transistor 80a having its collector terminal coupled to the red analog signal line (VID_R)60. The emitter of the second transistor 80a is connected to a third resistor 82a having a typical value of 49.9 Ohms. Such a circuit maintains a calculable amount of current flow through transistor 76a. That same amount of current will be sourced from the red analog signal line (VID_B) 60 such that the same amount of current flows through transistor 80a.

The green and/or blue analog signal lines 62, 64 can be connected to the emitter terminal of transistor 80a via resistors 84a and 86a to cancel negative crosstalk arising on the red analog signal line due to signal lines 62 and/or 64. Negative crosstalk on the red analog signal line arises as a lowered voltage level. Further, the green analog signal line 62 and/or the blue analog signal line 64 can be connected to the emitter terminal of transistor 76a via resistors 88a and 90a, respectively, to cancel positive crosstalk noise arising on the red analog signal line 60 with respect to those analog signals.

It should be noted that resistor pairs 88a and 84a, nor resistor pairs 86a and 90a, should not be installed at the same time because each resistor of the pair negates the affect of the other. If those resistors are installed at the same time, their respective effects will cancel and no resultant effect will be seen on the red analog signal line 60.

Four distinct circuit configurations can be generated by installation of different combinations of resistors 84a, 86a, 88a or 90a. The first configuration is used when negative crosstalk is detected on the red analog signal line 60 with respect to the green analog signal line 62 and when positive crosstalk is detected on the red analog signal line 60 with respect to the blue analog signal line 64. This configuration would be used with respect to line (1) of the sampled results shown above. Accordingly, resistor 84a is installed to couple the green analog signal line 62 to the emitter of transistor 80a. Also, resistor 90a is installed to couple the blue analog signal line 64 to the emitter of transistor 76a.

Figure 8:
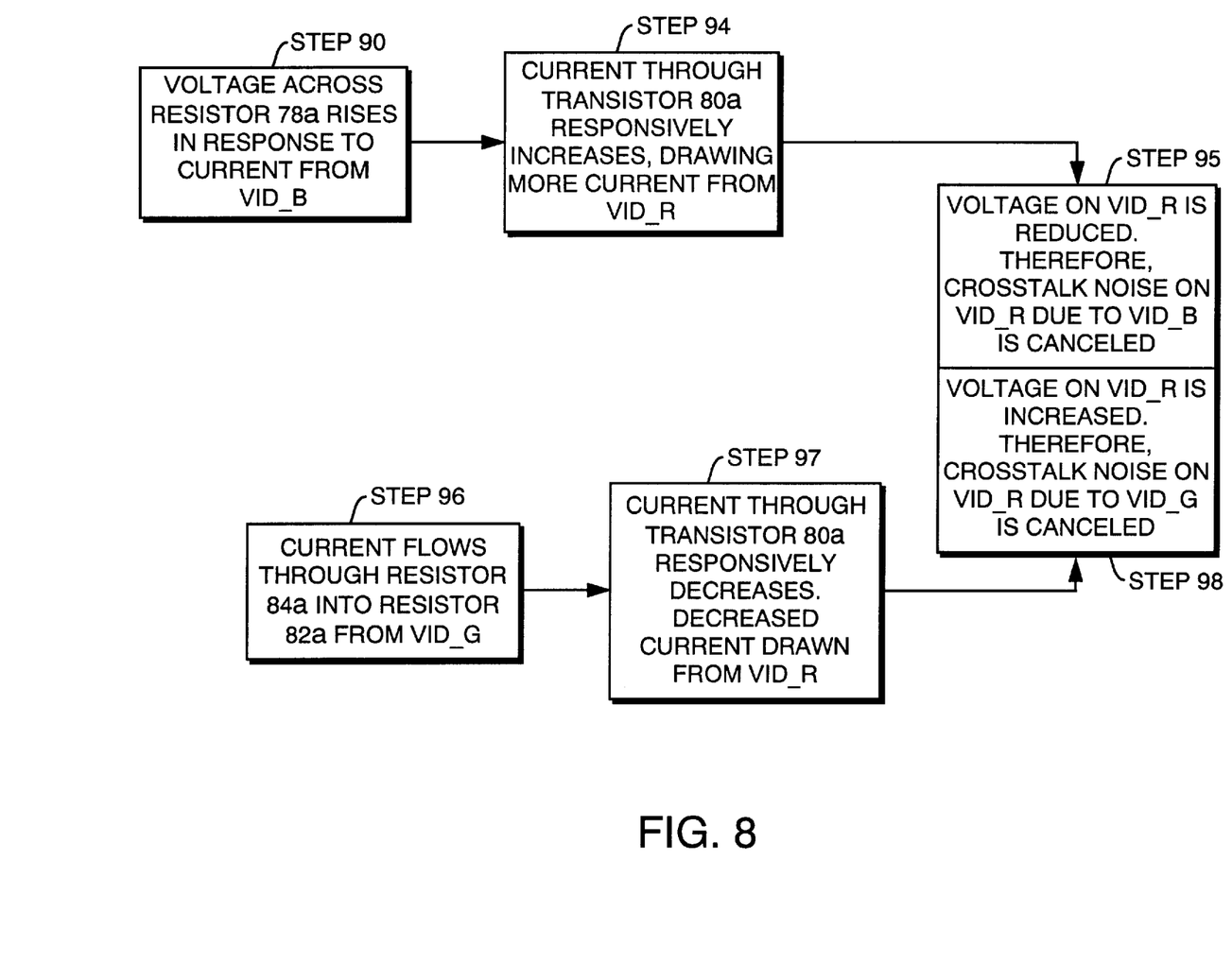
FIG. 8 is a flow diagram illustrating the operation of a first configuration of the three crosstalk compensation circuits of FIG. 6, according to the invention.

The operation of the first configuration will be described with respect to the flow diagram of FIG. 8. Because the blue analog signal line 64 is coupled to the emitter of transistor 76a, current will flow through resistor 90a and into resistor 78a. In response, the voltage across resistor 78a will rise proportionally (Step 90). Responsively, the current flowing through transistor 80a increases, thereby drawing more current from the red analog signal line 60 (Step 94). Therefore, the increased current draw from the red analog signal line 60 will allow the voltage level of that signal to decrease in proportion to the crosstalk on the blue analog signal line. Thus the positive crosstalk noise on the red analog signal line 60 due to the blue analog signal line is canceled (Step 95).

Further, because the green analog signal line 62 is coupled to the emitter of transistor 80a, current will flow through resistor 84a and into resistor 82a (Step 96). In response, the current through resistor 82a, due to transistor 80a, should be reduced such that the associated voltage remains constant. Therefore, transistor 80a reduces the amount of current that is sourced. Responsively, decreased current is drawn from the red analog signal line 60 (Step 97). The decreased current draw from the red analog signal line 60 will cause the voltage level of that signal to be increased in proportion to the voltage on the green analog signal line. Thus the crosstalk noise on the red analog signal line 60 due to the green analog signal line is canceled (Step 98).

Figure 9:
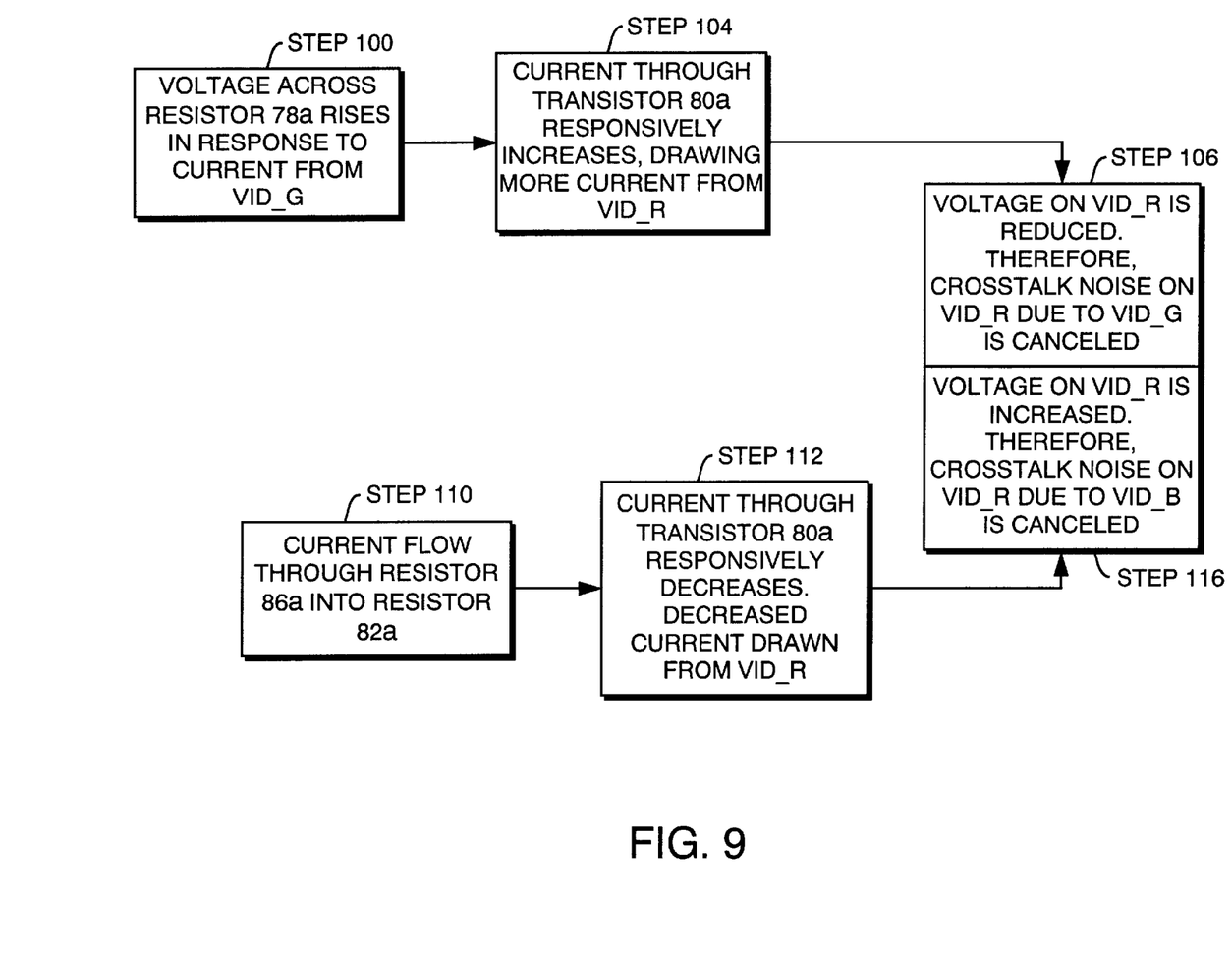
FIG. 9 is a flow diagram illustrating the operation of a second configuration of the three crosstalk compensation circuits of FIG. 6, according to the invention.

Referring now to the flow diagram of FIG. 9, the second circuit configuration will be described with respect to the current mirror 70a. This configuration is used when negative crosstalk is detected on the red analog signal line 60 with respect to the blue analog signal line 64 and positive crosstalk is detected on the red analog signal line 60 with respect to the green analog signal line 62. Accordingly, resistor 86a is installed to couple the blue analog signal line 64 to the emitter of transistor 80a. Also, resistor 88a is installed to couple the green analog signal line 62 to the emitter of transistor 76a.

Because the green analog signal line is coupled to the emitter of transistor 76a, current will flow through resistor 88a and into resistor 78a. In response, the voltage across resistor 78a rises (Step 100). Responsively, the current flowing through transistor 80a increases, thereby drawing more current from the red analog signal line (Step 104). Therefore, the increased current draw from the red analog signal line will cause the voltage level of that signal to decrease in proportion to the voltage on the green analog signal line. Thus the positive crosstalk noise on the red analog signal line 60 due to the green analog signal line is canceled (Step 106).

Further, because the blue analog signal line 64 is connected to the emitter of transistor 80a, current will flow through resistor 86a and into resistor 82a (Step 110). In response, the current through resistor 82a, due to transistor 80a, should re reduced such that the voltage remains constant. Therefore, transistor 80a reduces the amount of current that is sourced. Responsively, decreased current is drawn from the red analog signal line 60 (Step 112). The decreased current draw from the red analog signal line 60 will cause the voltage on that signal to be increased in proportion to the voltage on the green analog signal line. Thus the crosstalk noise on the red analog signal line, due to the blue analog signal line, is canceled (Step 116).

Figure 10:
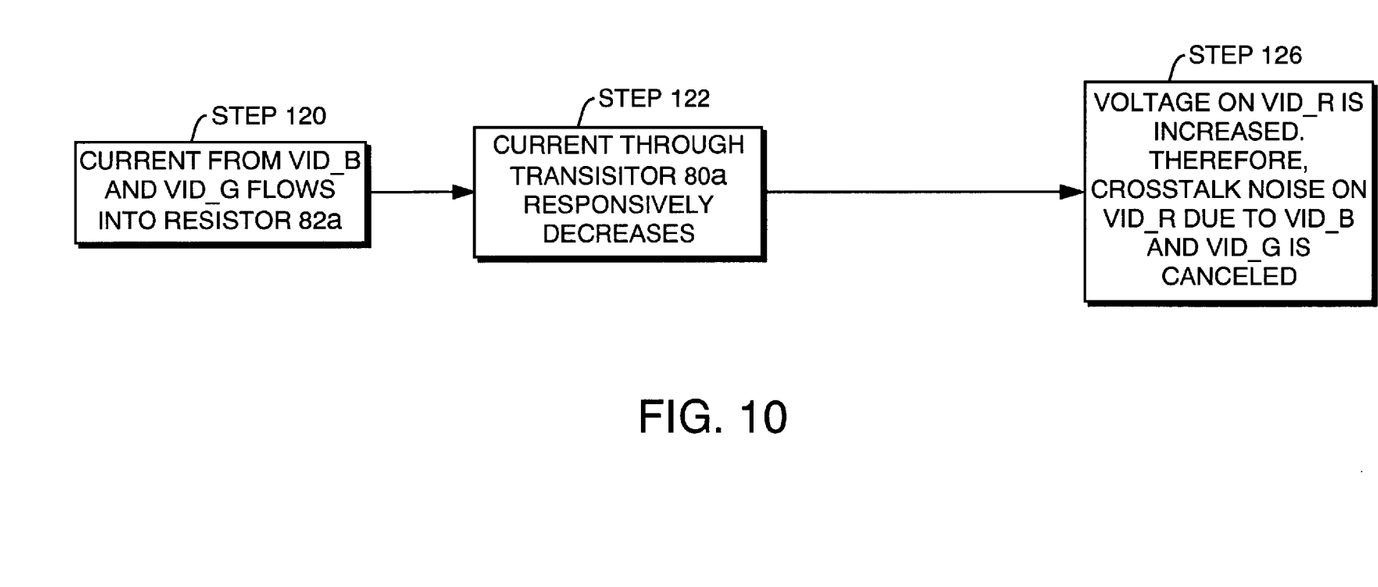
FIG. 10 is a flow diagram illustrating the operation of a third configuration of the three crosstalk compensation circuits of FIG. 6, according to the invention.

Referring now to FIG. 10, the third circuit configuration will be described with respect to the current mirror 70a. This configuration is used when negative crosstalk is detected on the red analog signal line 60 with respect to the blue analog signal line 64 and with respect to the green analog signal line 62. Accordingly, resistors 86a and 84a are installed to couple the blue analog signal line and the green analog signal line to the emitter of transistor 80a.

Because the blue analog signal line and the green analog signal line are connected to the emitter of transistor 80a, current will flow through resistors 86a and 84a into resistor 82a (Step 120). In response, the current through resistor 82a, due to transistor 80a, should be reduced such that the voltage remains constant. Therefore, transistor 80a reduces the amount of current that is sourced (Step 122). Responsively, decreased current is drawn from the red analog signal line 60. The decreased current draw from the red analog signal line 60 will cause the voltage on that signal to be increased in proportion to the voltages on the green and blue analog signal lines. Thus the crosstalk noise on the red analog signal line is canceled (Step 126).

Figure 11:
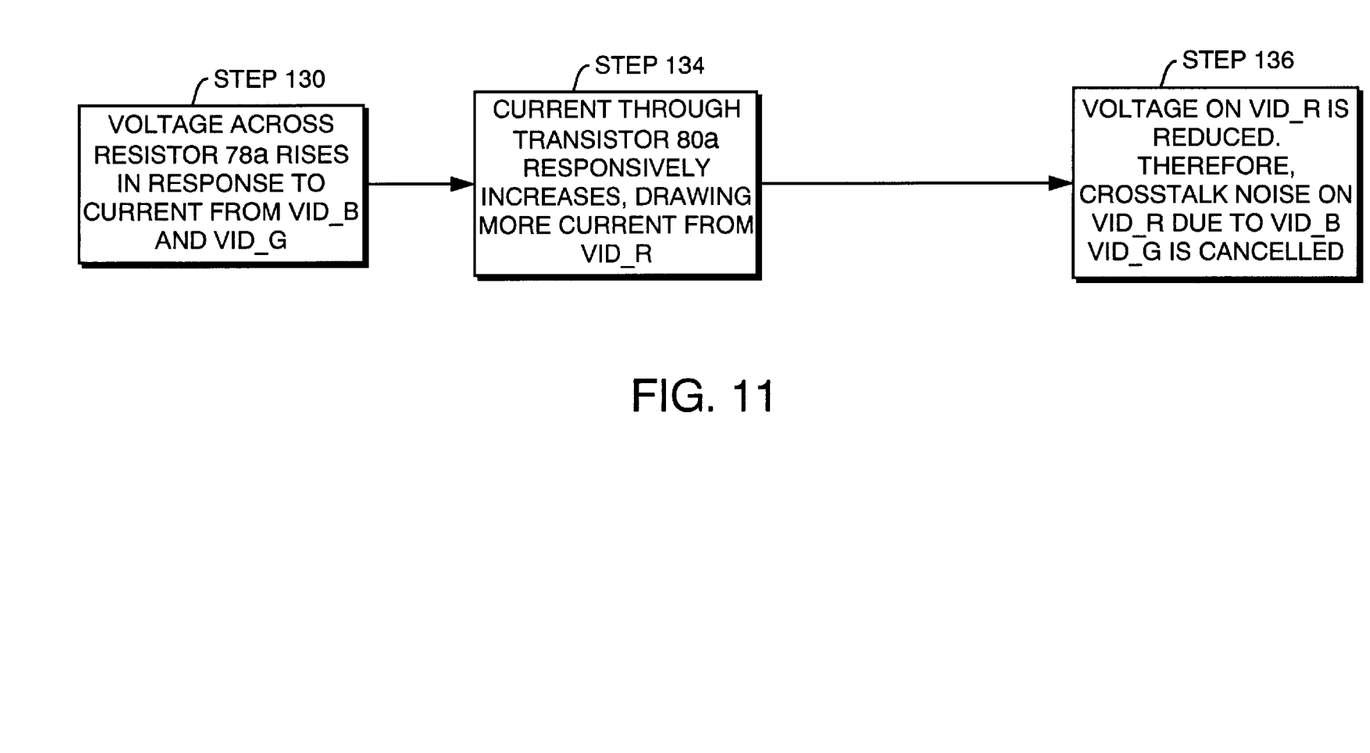
FIG. 11 is a flow diagram illustrating the operation of a fourth configuration of the three crosstalk compensation circuits of FIG. 6, according to the invention.

Referring now to FIG. 11, the fourth circuit configuration will be described with respect to the red current mirror 70a. This configuration is used when positive crosstalk is detected on the red analog signal line 60 with respect to the blue analog signal line 64 and with respect to the green analog signal line 62. Accordingly, resistors 90a and 88a are installed to couple the blue analog signal line and the green analog signal line to the emitter of transistor 76a.

Because the green analog signal line and the blue analog signal line are connected to the emitter of transistor 76a, current will flow through resistors 88a and 90a into resistor 78a. In response, the voltage across resistor 78a rises (Step 130). Responsively, the current flowing through transistor 80a increases, thereby drawing more current from the red analog signal line (Step 134). Therefore, the increased current draw from the red analog signal line will allow the voltage level of that signal to be decreased in proportion to the voltages on the green and blue analog signal lines. Thus the crosstalk noise on the red analog signal line is canceled (Step 136).

It should be further noted that similar configurations arise with respect to the green analog signal line (see current mirror 70b) and the blue analog signal line (see current mirror 70c).

Now that the method for determining which types of crosstalk will be coupled into each of the analog signal lines has been described, the determination of the resistor values 84a–84c, 86a–86c, 88–88c, and 90–90c will be detailed. To determine the ideal resistor values for resistors, the value of 786 k ohms (which is derived by the specific circuit impedance) is divided by the number of bits that the red, green or blue ghost image pixels are determined to differ from the surrounding dark pixels in the above mentioned test image. The above mentioned measurement results are replicated below:

|  | Red Ghost Level | Green Ghost Level | Blue Ghost Level |
| --- | --- | --- | --- |
| (1) Red surrounding level | — | −3.83 | +0.62 |
| (2) Green surrounding level | +1.71 | — | +2.16 |
| (3) Blue surrounding level | −2.85 | +3.09 | — |

Figure 12:
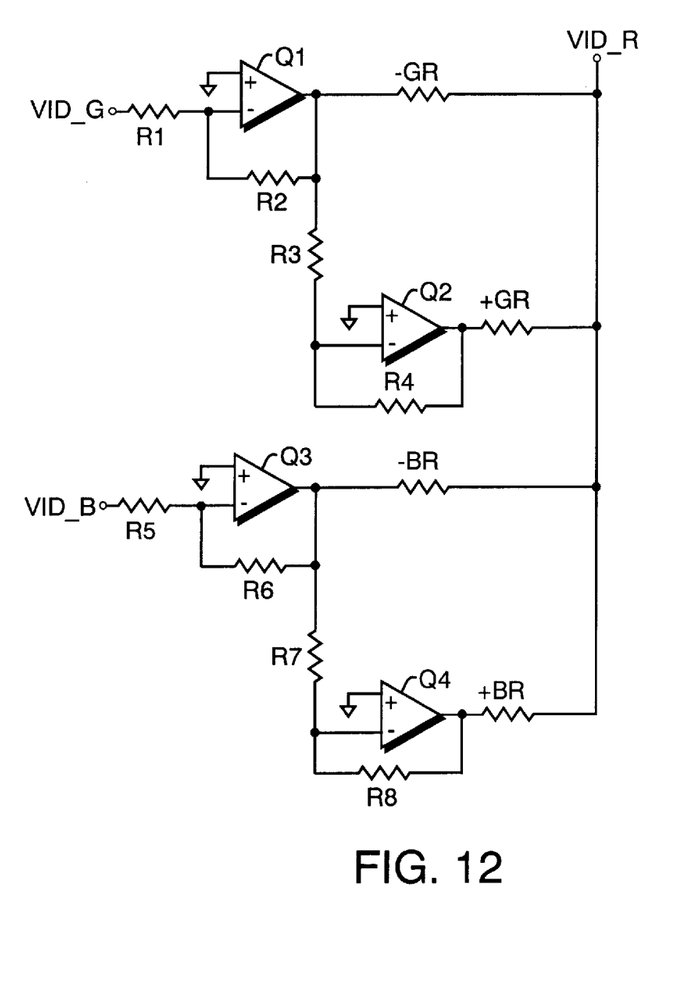
FIG. 12 is another embodiment of a crosstalk compensation circuit according to the invention.
Figure 13:
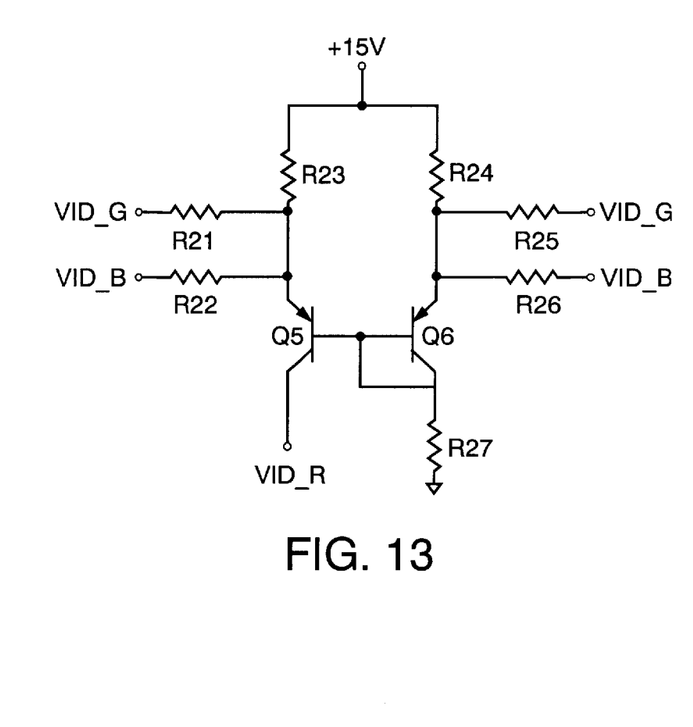
FIG. 13 is yet another embodiment of a crosstalk compensation circuit according to the invention.

Considering line (1), it is shown that positive crosstalk should be coupled to the red analog signal line 60 from the green analog signal line 62 via resistor 84a. The calculated value of 786 k ohms is divided by the difference between the average value of the red pixels of the ghost image and the surrounding dark pixels or 3.83. That calculation yields a resistor 84a value of 205 k ohms. Likewise, it is shown that negative crosstalk should be coupled to the red analog signal line 60 from the blue analog signal line 64 via resistor 90a. Therefore, the value of 786 k ohms is divided by the difference between the average value of the blue pixels of the ghost image pixels and the surrounding dark pixels or 0.62. That calculation yields a resistor 90a value of 1.27 Meg ohms. Performing similar calculations, the remaining measured data yields the following resistor values: resistor 88b is 460 k ohms, resistor 90b is 364 k ohms, resistor 84c is 276 k ohms, and resistor 90c is 254 k ohms. As described above, the selected resistors (84a, 90a, 88b, 90b, 84c, and 90c) will compensate for crosstalk. The remaining resistors (in this case—86a, 88a, 88b, 84b, 86c and 88c shown in the schematics of FIGS. 7A, 7B and 7C) should not be installed, otherwise they will negate the crosstalk compensation effect. The selected resistor values represent ideal values which could therefore be modified, if desired, to further improve the crosstalk cancellation. In addition to the above preferred embodiment of a crosstalk compensation circuit, numerous electrically equivalent circuits can be easily designed and used by those skilled in the art. Two of the many equivalent circuits are shown in FIGS. 12 and 13. The inventive crosstalk cancellation circuit uses operational amplifiers in FIG. 12, and another current mirror circuit in FIG. 13. Other transistor circuits can be used providing that the circuit is designed in accordance with the invention to pass a crosstalk correction signal in only one direction.

FIG. 12 is an alternative circuit to FIG. 7A for providing crosstalk cancellation signals for the red channel. The circuit includes operational amplifiers Q1, Q2, Q3 and Q4 as well as resistors R1 through R8. Positive or negative crosstalk effects of the blue and green signal into the red channel are provided, respectively, by resistors +BR, −BR, +GR and −GR. Circuits similar to FIG. 12 could be provided to eliminate crosstalk in the green and blue channels.

FIG. 13 is another alternative circuit for providing crosstalk cancellation signals for the red channel. It includes transistors Q5 and Q6 as well as resistors R21 through R27. The crosstalk effects of the green channel are provided by resistors R21 and R25, whereas the crosstalk effects of the blue channel are provided by resistors R22 and R26.

While this invention has been particularly shown and described with references to preferred embodiments thereof, it will be understood by those skilled in the art that various changes may be made therein without departing from the spirit and scope of the invention as defined by the appended claims.

What is claimed is:

1. An apparatus for cancelling crosstalk noise on signal lines from an image sensor, comprising:

a compensation circuit coupled to a first one of said signal lines, said compensation circuit adjusting an electrical characteristic of said first one of said signal lines in response to an electrical characteristic of a second one of said signal lines such that said crosstalk noise arising on said first one of said signal lines due to said second one of said plurality of signal lines is at least partially cancelled;

wherein said electrical characteristic of said first one of said signal lines is an amount of current drawn from said first one of said signal lines, and said current is reduced if a voltage level on said first one of said signal lines is determined to be too low due to crosstalk from said second one of said signal lines.

2. The apparatus of claim 1 wherein said compensation circuit further adjusts said electrical characteristic of said first one of said signal lines in response to an electrical characteristic of a third one of said plurality of signal lines to compensate for crosstalk noise.

3. The apparatus of claim 2 wherein said electrical characteristic of said third one of said signal lines is a voltage level.

4. The apparatus of claim 3 wherein said electrical characteristic of said first one of said signal lines is an amount of current drawn from said first one of said signal lines, said current being reduced when said voltage level on said first one of said signal lines is determined to be too low in response to crosstalk due to said third one of said signal lines.

5. The apparatus of claim 4 wherein sad current is reduced if a voltage level on said first one of said signal lines is determined to be too low due to crosstalk from said second one of said signal lines.

6. The apparatus of claim 1 wherein said current is increased if a voltage level on said first one of said signal lines is determined to be too high due to crosstalk from said second one of said signal lines.

7. An apparatus for cancelling crosstalk noise on signal lines from an image sensor, comprising:

a compensation circuit coupled to a first one of said signal lines, said compensation circuit adjusting an electrical characteristic of said first one of said signal lines in response to an electrical characteristic of a second one of said signal lines such that said crosstalk noise arising on said first one of said signal lines due to said second one of said plurality of signal lines is at least partially cancelled;

a first transistor having a collector terminal coupled to said first one of said signal lines, an emitter terminal coupled to a first terminal of a first resistor, and a base terminal, said first resistor having a second terminal coupled to an electrical ground;

a second transistor having a base terminal and a collector terminal each coupled to said base terminal of said first transistor, and further coupled, through a first resistor, to a power supply, said second transistor further having an emitter terminal coupled to a first terminal of a second resistor, said second resistor having a second terminal coupled to an electrical ground;

said second one of said plurality of signal lines being coupled to said first terminal of said first resistor to cancel negative crosstalk arising on said first one of said signal lines due to said second one of said signal lines; and said second one of said signal lines being coupled to said first terminal of said second resistor to cancel positive crosstalk arising on said first one of said signal lines due to said second one of said signal lines.

8. A scanner apparatus, comprising:

an image acquisition device that detects light from a document;

an analog to digital converter for generating image data from image signals generated by the image acquisition device;

separate analog signal paths that convey the image signals corresponding to different colors from the image acquisition device to an analog to digital converter; and at least one compensation circuit connected between the analog signal paths to cancel said crosstalk noise between the analog signal paths;

wherein said compensation circuit adjusts an electrical characteristic of a first one of said analog signal paths in response to an electrical characteristic of a second one of said analog signal paths such that crosstalk noise arising on said first one of said signal lines due to said second one of said signal lines is at least partially compensated, said electrical characteristic of said first one of said analog signal paths is an amount of current drawn from said first one of said analog signal paths, and said current is reduced if a voltage level on said first one of said analog signal paths is determined to be too low due to crosstalk from said second one of said analog signal paths.

9. The apparatus of claim 3 wherein said compensation circuit adjusts said electrical characteristic of said first one of said analog signal paths in response to an electrical characteristic of a third one of said analog signal paths such that crosstalk noise arising on said first one of said signal lines due to said third one of said signal fines is at least partially compensated.

10. The apparatus of claim 3 wherein said current is increased if said voltage level on said first one of said analog signal paths is determined to be too high due to crosstalk from said second one of said analog signal paths.

11. A method for cancelling crosstalk noise on signal lines from an image sensor device, comprising the steps of:

connecting a compensation circuit to a first one of said signal lines;

adjusting, by said compensation circuit, an electrical characteristic of said first one of said signal lines in response to an electrical characteristic of a second one of said signal lines such that said crosstalk noise arising on said first one of said signal lines due to said second one of said plurality of signal lines is canceled, said electrical characteristic of said first one of said signal lines being an amount of current drawn from said first one of said signal lines; and reducing said current when a voltage level on said first one of said signal lines is determined to be too low due to crosstalk from said second one of said signal lines.

12. The method of claim 11 wherein said adjusting step further includes the step of:

adjusting said electrical characteristic of said first one of said signal lines in response to an electrical characteristic of a third one of said signal lines such that crosstalk noise arising on said first one of said signal lines due to said third one of said signal lines is canceled.

13. The method of claim 11 wherein said adjusting step further includes the step of: adjusting said electrical characteristic of said first one of said signal lines in response to a voltage level of said second one of said signal lines.

14. The method of claim 11, further including the step of: increasing said current when a voltage level on said first one of said signal lines is determined to be too high due to crosstalk from said second one of said signal lines.

* * * * *